Figure 1:
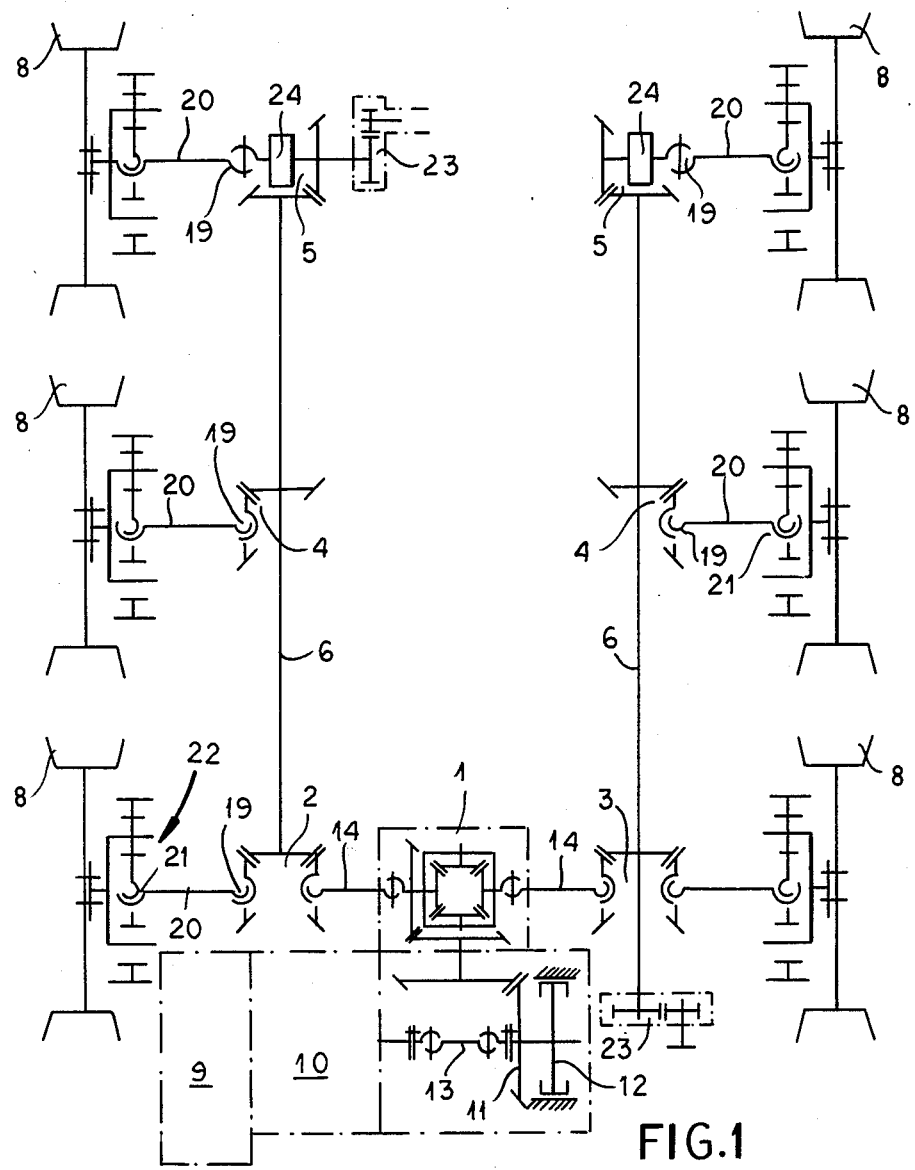

United States Patent [19]

Ehrlinger et al.

[11] Patent Number: 4,718,509
[45] Date of Patent: Jan. 12, 1988

[54] MULTI-AXLE VEHICLE WITH SINGLE WHEEL DRIVES

[75] Inventors: Friedrich Ehrlinger; Manfred Goeft, both of Friedrichshafen, Fed. Rep. of Germany

[73] Assignee: Zahnradfabrik Friedrichshafen AG, Friedrichshafen, Fed. Rep. of Germany

[21] Appl. No.: 777,788
[22] PCT Filed: Dec. 19, 1984
[86] PCT No.: PCT/EP84/00412
   § 371 Date: Sep. 30, 1985
   § 102(e) Date: Sep. 30, 1985
[87] PCT Pub. No.: WO85/03042
   PCT Pub. Date: Jul. 18, 1985

[30] Foreign Application Priority Data

Jan. 13, 1984 [LU] Luxembourg ...... PCT/EP84/00008

[51] Int. Cl.$^4$ ............................................. B62D 61/10
[52] U.S. Cl. .................................. 180/24.08; 180/247
[58] Field of Search ................... 180/22, 24.04, 24.08, 180/24.1, 247, 258, 259, 233

[56] References Cited

U.S. PATENT DOCUMENTS

| | | | |
|---|---|---|---|
| 3,058,558 | 10/1962 | Hawk | 180/247 |
| 3,768,821 | 10/1973 | Adams | 180/3 A |
| 3,930,550 | 1/1976 | Rose et al. | 180/24.08 |
| 4,273,460 | 6/1981 | Ueno | 180/247 |

FOREIGN PATENT DOCUMENTS

| | | | |
|---|---|---|---|
| 99790 | 2/1984 | European Pat. Off. | |
| 734379 | 4/1943 | Fed. Rep. of Germany | |
| 1902942 | 8/1970 | Fed. Rep. of Germany | 180/259 |
| 2835865 | 2/1980 | Fed. Rep. of Germany | |
| 810821 | 3/1937 | France | |
| 831375 | 9/1938 | France | |
| 861057 | 1/1941 | France | |
| 135813 | 5/1952 | Sweden | 180/259 |
| 12038 | of 1912 | United Kingdom | |
| 104384 | 3/1917 | United Kingdom | |
| 656586 | 8/1951 | United Kingdom | 180/24.08 |
| 1060660 | 3/1967 | United Kingdom | |

OTHER PUBLICATIONS

*Automobiltechnisches Handbuch*, p. 514—15th edition—Technischer Verlag Herbert Cram, Berlin, 1942.

Primary Examiner—John J. Love
Assistant Examiner—Ross Weaver
Attorney, Agent, or Firm—Karl F. Ross; Herbert Dubno

[57] ABSTRACT

Multi-axle vehicles with individual wheel drives are, for the purpose of improving ground clearance, also equipped with drive trains split in two arrayed in proximity of the wheels, in which distribution drives drive the wheels via articulated shafts. In order that these articulated shafts, despite the short distance between the distribution drive and the wheel hub, do not become so short that either the angle or excursion is very limited, or that the articulation must be stressed unfavorably, and to permit larger spring paths for the wheels, the articulations were integrated into the housings of the distribution and/or wheel hub drives to the extent that the center of the articulation comes to lie immediately at or even behind the intersection of the articulated shaft with the drive train and below the output bearing. The latter receives therto a specially large diameter and short construction length.

9 Claims, 7 Drawing Figures

MULTI-AXLE VEHICLE WITH SINGLE WHEEL DRIVES

This invention concerns a multi-axle vehicle with individual wheel drives according to the overall concept of claim 1, and deals in particular with improvements of multi-purpose vehicles with individually sprung wheels which are inteded to be able to tolerate high speeds as well as rough terrain. Vehicles of this kind, in which the wheels are drivable via trains of drive shafts disposed away from the (vehicle)center and in proximity of the wheels, by means of bevel gear distribution drives, are shown in FR-Ps No. 375. However, from this, no teachings are revealed as to how, for the purpose of maximum possible reduction of ground clearance, and maximum floor pan width, the desired maximum possible proximity of the distribution drives to the wheels can be attained even with articulated axles without thereby, because of the proximity to the wheels, having to reduce the springs paths of the individual drive axles, or having to drive their articulations with disadvantageous angles of excursion. If between the distribution gear drive and wheel, or wheel drive, only very short distances remain for the purpose of dropping the vehicle floor pan, or attaining maximum possible ground clearance and widening of the dropped vehicle floor pan, respectively, then all solutions known up to now with distribution drives disposed in proximity of the wheels are unsatisfactory.

Nevertheless, wheel drives in which distribution drive and wheel are connected by means of connecting shafts via articulations have been known for a long time. Thus, for example, R. Bussien already shows a front-drive shaft, in which an axle shaft lies in an articulation on the side of the drive, in "Automobiltechnisches Handbuch" (published by) Technischer Verlag H. Cram, Berlin 1942, 15th edition, FIG. 53, on page 514. However, in this case it was possible to use a relatively long axle shaft with relatively small angles of excursion due to the placement of the drive near the center of the vehicle. Therefore, this principle does not correspond to the requirement of the capability of arraying the distribution gear in the immediate proximity of the wheel, nor is it applicable to vehicles with more than one driven axle for which large ground clearance is required.

It is therefore the aim of the invention to create a multiple-axle vehicle with individual wheel drives, with shaft trains in proximity of the wheels, in which despite the given short distances to the wheel or wheel drive, respectively, connecting shafts with articlations can be joined in such manner that large ground clearance and sufficiently large spring paths can be made possible in order that all drive elements can sustain normal stresses and that a wide and low floor pan can be provided in the vehicle.

The solution of this taks is attained in accordance with the characteristics of claim 1 in such manner that the pivot of the articulation of the connecting shaft is placed as close as possible to the corresponding input and output axle, and that the connecting shaft which for all practical purposes utilizes the assembly distance in its entirety, without being prevented from swinging by tightly enclosing bearing bushings, or housing extensions, and that even for large spring paths no unusually large angles of excursion must be provided in the articulation. This arrangement accomplishes further that the articulation is supported with only nominal bending moments in the housing of the distribution drive, and is therein better protected from flying stones and dirt than in the usual open arrangement built in front of the bearing of the drive, toward the wheel. The large bearings provide, in addition to high load capacity, the advantage of easy access to the articulation despite compact placement inside the hub of the axle drive wheel, which in the example is realized as a bevel gear, but is also possible as a spur gear in a spur or planetary drive. Advantageous embodiments of the invention are described in the subordinate claims.

Space is provided for the angle of excursion, and at the same time, a high load capacity is attained, by an axially short but radially large bearing design inside the support collar which extends from the articulation.

By means of a screw connection between the support collar or the articulation outer ring, respectively, and the drive wheel, it is nevertheless possible to achieve, in addition to the advantages of an integrated articulation arrangement, to keep the interior of the drive housing free (of obstructions, Transl.) e.g. for passing through drive shafts, or, if applicable, a shifting element.

Additionally, a reliable axial fixation, and a short direct flow of power between drive wheel and connecting shaft are achieved.

By attaching the outer ring of the articulation axially on the side of the drive, to a coupling piece, which can be coupled to the connecting shaft in any already known manner, it is possible to place the articulation even closer toward the point of intersection between the axis of the connecting shaft and the drive housing, especially since the drive wheel is arrayed on the inside of the housing which is away from the (vehicle Transl.) wheel.

The dimensions of the sealing bellows on the articulation adjust themselves to its angular excursions as a consequence of its conformation which tapers towards the articulation, so that only minimum material strains occur, but also that the radial and axial installation space required for the sealing bellows remains without influence upon the effectively usable angle of excursion of the axle shaft.

The dual duty of the coupling piece as drive cover and support collar likewise saves length as well as weight and simplifies assembly and manufacture.

A shaping of the shift element as a sliding sleeve providing structural closure is particularly advantageous for higher torques, and saves space. At the same time, there are embodiments of the shift element possible which function differently, without relinguishing the principle of the inveniton. Thus it is possible to insert e.g. multi-disk couplings, overrunning couplings or freewheeling devices, or other automatic shifting elements in such manner that the connecting shafts can remain sufficiently long despite close proximity of the distribution drives to the wheels.

The insertion of a fluid power shift element into the drive housing also reults in its advantageous protection from damage due to a short power path, secure from the effects of dirt, from the piston to the shift element, without the requirement that a special space would have to be kept free below the vehicle.

The multiply variable possibility of arranging axles in accordance with the invention in identical drive housings yields not only advantages in manufacture and maintenance, but facilitates also the arrangement in line of identical distribution drives, e.g. via multiply articulated shaft trains for several driven axles, in which single drives can be disconnected. In this case, the connecting drive shafts need not also be equipped with articulations.

By retaining large axle bevel gears through staying with a drive wheel ratio in the area of about 1:1, and a wheel head drive with correspondingly high gear reduction , not only is the distribution to further output drives favored, but space is created for inclusion of the articulation into the drive wheel, and the connecting shaft is further stressed by the smallest possible torque, therefore kept slim for small, mobile articulations with large angles of excursion despite short overall length of shaft.

Also, the inclusion of the articulation arrangement into a wheel hub drive yields corresponding advantages and makes possible a longer overall shaft length with short distance of the drive itself.

The invention is decribed in detail in the following by means of drawings and schematic examples of embodiments.

Figure 2:
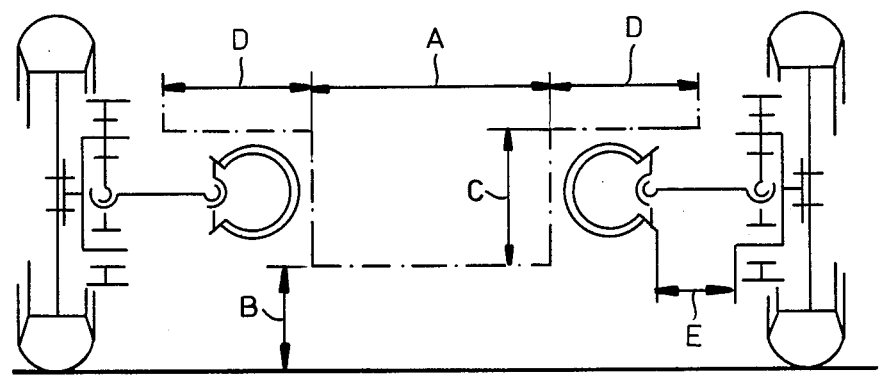
Figure 3:
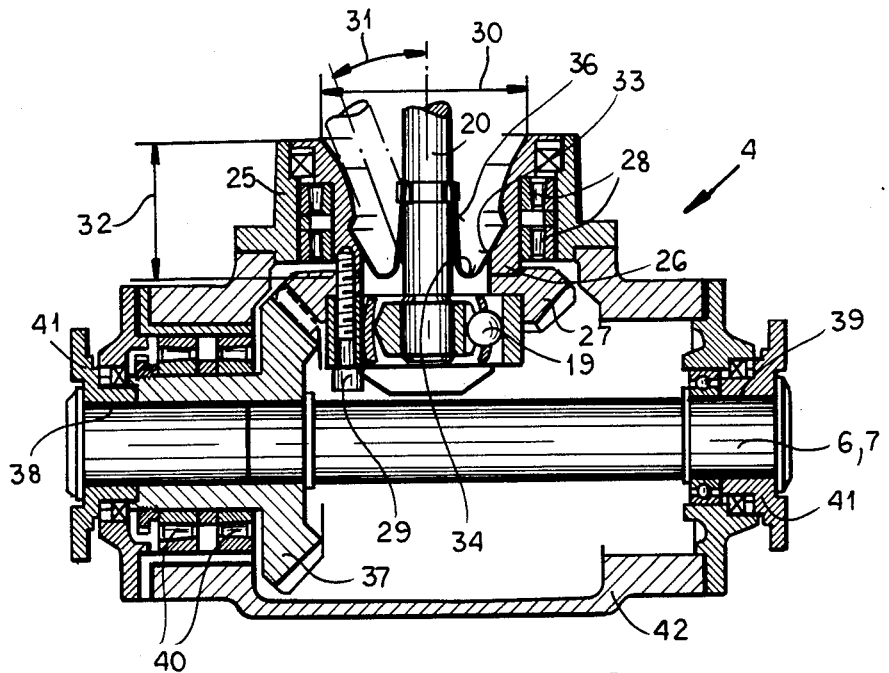
Figure 4:
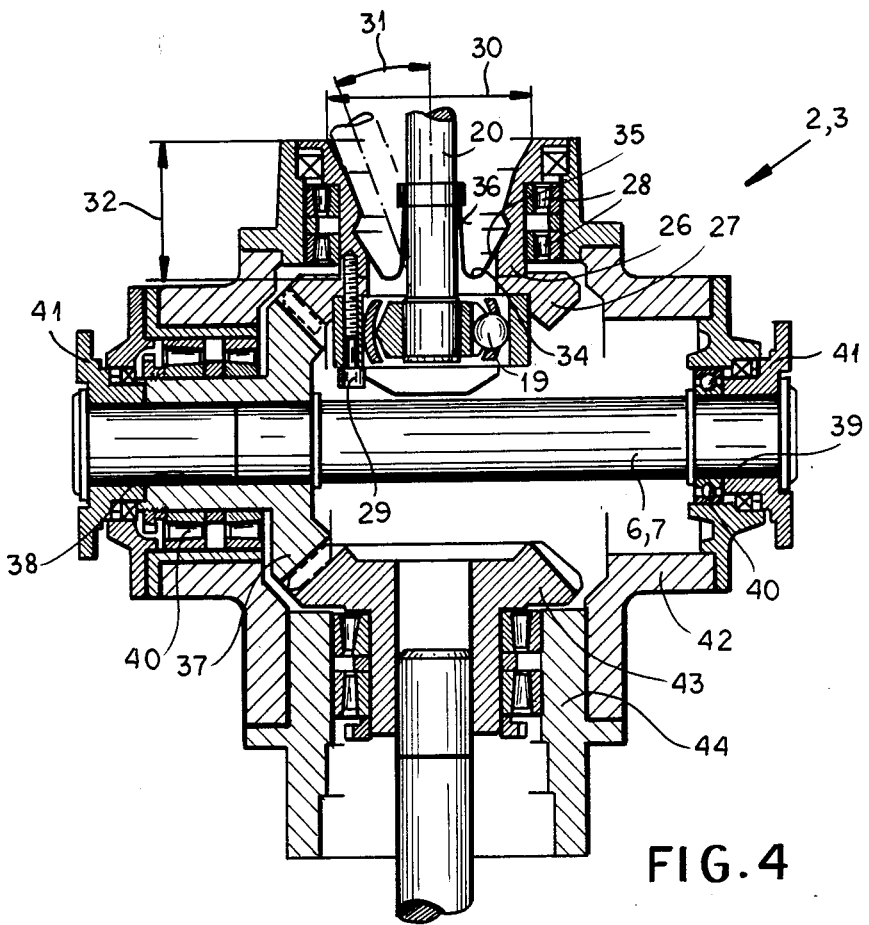
Figure 5:
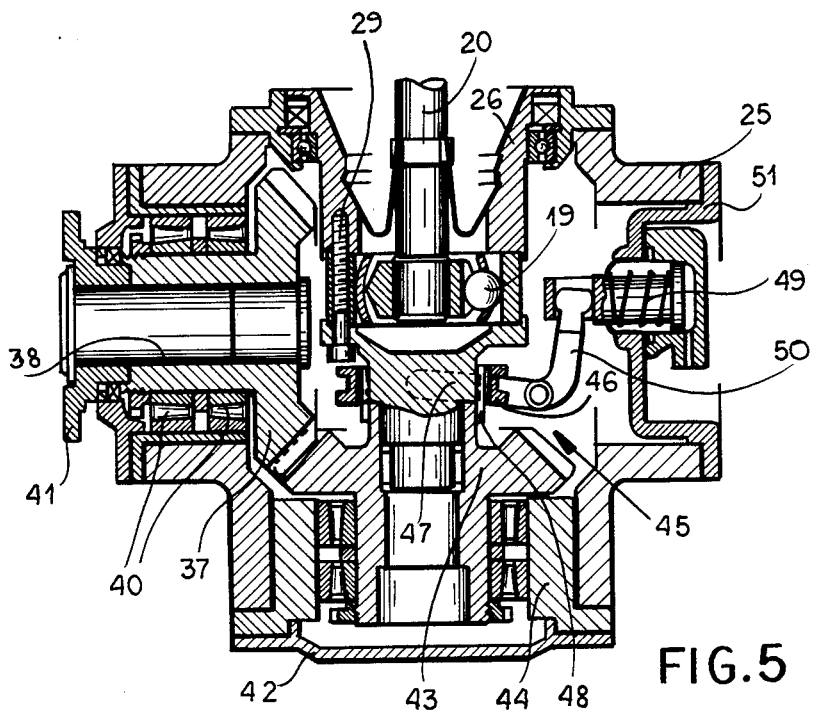
Figure 6:
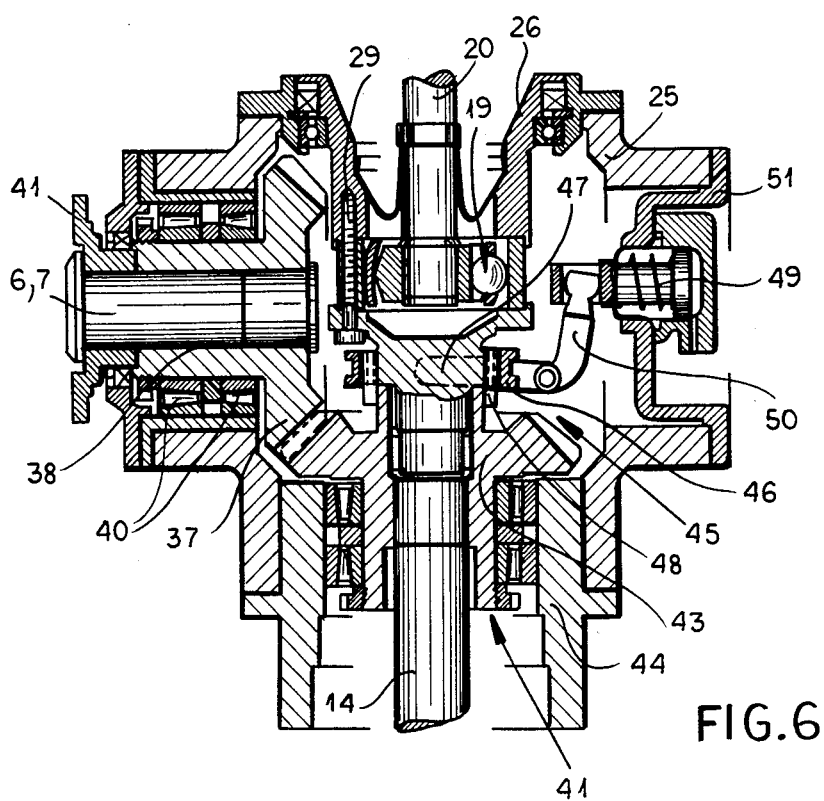
Figure 7:
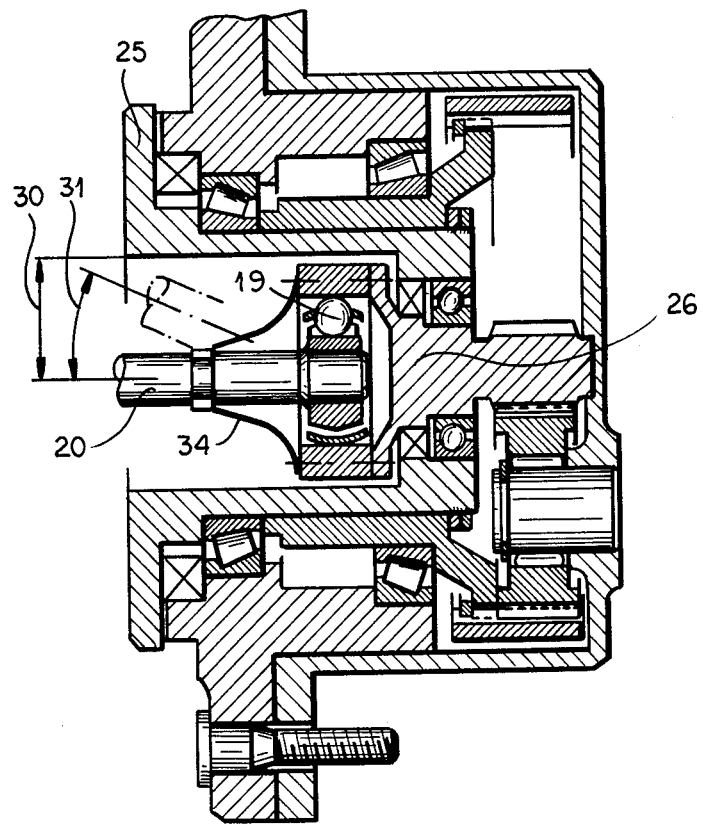

FIG. 1 shows the scheme of a drive arrangement for a multi-axle vehicle with drive trains in proximity of the wheels FIG. 2 shows thereto a cross section through the bottom portion of the vehicle FIG. 3 shows a distribution drive for installation in a wheel hub, with a connecting shaft branching off from a passing-through drive shaft FIG. 4 shows a similar distribution drive with a further output shaft branching off coaxially to the connecting shaft FIG. 5 shows a construction according to FIG. 3, but with a disconnect capability by means of a sliding sleeve FIG. 6 shows a construction according to FIG. 4, but also with disconnect capability by means of a sliding sleeve FIG. 7 shows the embodiment of the distribution drive as a planetary drive.

In FIG. 1 is shown a multi-axle vehicle with three axles (having) individual wheel drives, which shall all be drivable individually by a central 1 and additional distribution drives 2, 3, 4, 5, 7, 8 in the proximity of the wheels. One has chosen two drive trains, 6, 7, in a manner in itself known, which are placed as close as possible towards wheels 8, in order to attain in the central portion of the vehicle large ground clearance at sufficient width, or to be able to lower the load space. The engine 9 arranged here crosswise and shift mechanism 10 is followed here by a primary bevel gear drive 11 with attached locking brake 12, which (primary bevel drive, Transl.) is drivable, depending on differences in (mounting) height, via an articulated shaft 13, and which in turn drives rigidly into a central axle drive 14 (main differential), from which to each side differential shafts 14, realizable if required as articulated shafts, lead further to distribution drive 2, 3, in proximity to the wheels. In the example these are provided with drive shaft ends 16 as well as a coaxial (output) 17 and one (at 2) or two right-angle outputs 18 (at 3) (Translator's Note: items 16, 17 and 18 are not called out in any of the figures. Also, central axle drive or main differential should be called out as item 1, not item 14). The coaxial outputs 17 go here via articulation 19 which isintegrated into distribution drives 2 and 3, respectively, in that the pertinent connecting shaft 20 is journaled as close as possible to the center of the drive. When the vehicle is fully loaded, the center of the distribution drive (2 or 3, respectively) is located as a rule approximately at the height of the center of the pertinent wheel 8, and as close to it as the connecting shaft 20 or its articulations 19 respectively in the distribution drives 2 or 3 respectively and 21 in wheel 8 between wheel drive 22 will allow. In the sense of the invention, this proximity is reenforced considerably particularly due to the gain in length because of the integration of articulations 19 into the corresponding drives, as opposed to hitherto known constructions of articulated shafts, without in this case causing the connecting shafts 20 to become too short, or the angles of excursion in articulations 19, 21 become too great. Where required, angles of excursion of more than 50° can be provided. Finally, it is in the case of such application that the rotational speed of the axle ahead of the articulation is kept relatively high, and only the following wheel drive 22 is constructed with a high reduction ratio which then leads to higher moments and appropriate shaft diameters. Thus, the torque in the connecting shaft 20 remains small, and it can be made slim and with small articulations 19, 21. Also, in the example, the drive shaft trains 6 and 7, respectivey, which continue from the distribution drives 2 and 3 respectivel located next to the central axle drive 1 can be held small or light, respectively. The first distribution drive 3 located in the example to the right and next to the wheel has a second perpendicular branch, e.g. for a power take-off 23. If from any shaft train 6 or 7, respectively, lying parallel to the direction of vehicle motion, only a simple single-wheel drive is to branch off to one side, then a construction of the distribution drive with a pssing-through drive shaft and a perpendicular output 4 will suffice. If there is a flexible vehicle frame structure, it is of course also possible to connect, in addition toaxle shaft 20, also the shaft train ends which drive into the pertinent distribution drive 4, by means of articulations. However, for clarity, such articulations have not been drawn here. The distribution drives with passing-throughdrive shaft 6 and 7, respectively, and a connecting shaft 20 driving off at right angles, will preferably have the same principal dimensions as such 2 and 3, respectively, which have a drive shaft coaxial to axle shaft 20, and also such 5 with built-in disconnect means 24, as they are preferably provided in the steering axles of the multi-axle vehicle. —The advantages of the invention will of course also come into play with different arrangement of axles. Thus, vehicles with even more single-wheeldrives as well as vehicles with only 4 single-wheel drives and with other combinations of central axle drives (or differentials, respectively) 1 with transmission drives 10 and motors 9 are thinkable according to the same basic principles and with the same advantages, without having to do without the characteristics and advantages (ground clearance, protection of the axle shafts, low floor pan) according to the invention.

FIG. 2 shows a section through the drive arrangementwith the width A gained in the clear width of the floor achieved due to the placement of the drive trains in proximity to the wheels, which lying by the ground clearance B above the terrain permits a lowering of the vehicle floor by the dimension C. The load space of the width D lying above the distribution drives can in future be utilized as seating surface for becnhes etc. Decisive for the width A for the dropped floor is the construciton length E of the connecting shaft to the wheels because of the predetermined dimensions of the distribution drives.

FIG. 3 shows the simple drive 4 with the axle shaft 20 branching off at right angles from the passing-through drive shaft 6 an 7, respectively, and articulation 19 drawn into housing 25 to the furthest possible extent. In this case, between articulation 29 and its support point 26 disposed on the wheel side, is the drive wheel 27, realized here as bevel gear, so that the latter, together with articulation 19, is guided by means of housing bearings 28 of axle shaft 20 which carry support collar 26, in common support. (Translator's Note: support "point" 26, above, is a literal translation. However, it should read support collar). In the example, threaded bolts 29 hold together articulation 19, drive wheel 27 and support collar 26. Meanwhile, a one-piece execution of articulation outer race and drive wheel is also realizable. The large diameter of the support collar 26 as well as its wheelside enlargement 30 permit the axle shaft 20 totally sufficient large angles of excursion 31 with simultaneous gain in effectively usable length of axle by more than the dimension 32 of the support collar 26, as compared to conventional arrangement of the articulation outside of the distribution drive housings. Sealing action toward the wheel side is achieved by means of a funnel-shaped sealing bellows 33 which is clamped between axle shafts 20 and and support collar 26 in such manner that a single convolution 34 comes to lie shortly before articulation 19, and that its otherwise smooth envelope surfaces 35, 36, have practically no deleterious effect on the angle of excursion 31 of axle shaft 20. If articulation 19 is executed as a so-called interiorly centered synchronous articulation, then the space requirements are particularly favorable. Also, due to the fact that the bearing housings 28 which carry the support collar 26 are made very large, preferrably larger tha articulation 19 itself, and that therefore the support collar 26 has a large diameter, ' in addition to ample space for the swinging connecting shaft 20 there results an especially highly stressable bearing (array) for the drive wheel for high power throughput and long life even in the presence of fluctuations of the rotation. The entire fully assembled articulation 19 with inserted connecting shaft 20 together with support collar 26 and the housing bearing 28 can be placed into housing 25 in the manner of a flange, and be secured there. The example of FIG. 3 shows drive wheel 27, executed here as bevel gear, driven by a drive wheel 37 of approximately the same size on drive shaft 6 or 7, respectively, which in both through-openings 38, 39 of housing 25, exhibit drive shaft bearings 40 with shaft seals. The shaft sections (6 and 7, respectively) kept within housing 25 are capable of being connected via shaft connections 41 to extension sections of the drive trains, which are not shown. A large housing cover 42 dis posed opposite articulation 19 permits a simple assembly of the articulation, as well as the utilization of the same housing 25 for application with additional input or output wheels 43 (e.g. for dual output, a power take-off 23 or similar) as is shown in detail in FIG. 4.—In lieu of housing cover 42, a bearing sleeve 44 is provided here for such a second input or output wheel 43 and its coordinated shaft (e.g. 14), which if desired here can be equipped in like manner with an articulation 19 for a connecting shaft 20 lying opposite, without requiring additional assembly space.

FIG. 5 shows housing 25, the same in principle, but without a passing-through drive shaft 6 (7), with only right-angle branch-off to connecting shaft 20, but with disconnect means 45 of the latter from the drive train.

The disconnect means 45 is realized here a a coupling piece 47 carrying a sliding sleeve 46, which rotates with the support collar 26 of articulation 19. By means of the sliding sleeve 46 it can be connected to the shaft gearing 48 in a driving mode to the drive wheel 43 which is here placed into the side of the housing 25 which lies opposite the articulation 19. In this variation, the drive wheel 27 directly connected to articulation 19 is absent. The sliding sleeve 46 is actuable here by means of a fluid power actuator 49 journaled in housing 25 and also sunk into housing 25, with a slidable shift lever 50, and is accessible via a further cover 51, which is disposed at right angles to connecting shaft 20.

The omission of passing-through drive shaft 6 (7) makes it possible in this arrangement of the input and output wheels 37, 43 that the articulation 19 can be drawn into the middle of drive housing 25 almost to the center of output shaft 37, because the gain in length 32 for axle shaft 20 can be enlarged by about the size of shaft 6 or 7, respectively, and that support collar 26, due to the elimination of the direct drive wheel 27, must have a housing bearing 28 which can be built shorter. The disconnect means 45 can be realized in other ways while retaining the underlying principle, e.g. with a multi-disk coupling, self-locking differential, overrunning clutch, or similar, but the advantage attained by the arrangement according to the invention remains unchanged (namely that, Transl.) the connecting shafts 20 clearly can be made longer than the available space corresponding to the clearance between wheel 8 or wheel hub drive 22 and the distribution drives 1. . . 8, and (further, Transl.) the intergration safe from damage of articulation 19 into drive housing 25.

These are especially favorable for multi-axle vehicles which must be used in the field or on poor roads and are to be protected against stresses thus arising by single-wheel spring provisions with large excursions.

It will thereby be particularly advantageous to be able to use for the integration of the articulations into the distribution drives telescoping linkages which will facilitate axial compensation in the articulation shaft.

FIG. 7 shows the distribution drive as wheel hub drive with a planetary drive, in which articulation 19 is built into drive housing 25 on the side of the drive from the axle bearings, so that thus the effective length of connecting shaft 20 (distance from the articulation at the ends of the connecting shafts) is increased by about half the length of the wheel hub, without impairing the angle of excursion. The support collar 26, in which the outer rings of articulation 19 are fastened, is at the same time the shaft of the sun wheel which is journaled in the hollow wheel carrier. The wheel bearing is fixed upon the hub carrier with the same nuts which also hold the hollow wheel. The length requirement of the articulation in the hub corresponds aproximately to that of the large, axially close positioned axle bearing. ' For particularly short construction length, and the possibility to use correspondingly large sun wheels, it is possible to provide external gear teeth on the support collar 26 or the outer ring of articulation 19 directly, around which the planet or wheel hub drive is built.

We claim:
1. A multi-axle vehicle, comprising:
   a plurality of driven wheels spaced apart along opposite sides of a vehicle chassis and provided with respective wheel drives adjacent the respective wheels;

a respective drive train extending along each of said opposite sides and including a respective distribution drive spaced from but proximal to the respective wheel drive;

a central drive operatively connected to both of said drive trains for driving same;

a respective shaft connecting an output gear of each of said distribution drives with an input gear of a respective wheel drive; and articulation means interposed between each of said shafts and the respective distribution drive, each of said distribution drives comprising:

a housing enclosing the respective said output gear, a respective collar connected to the respective said output gear in the respective housing and having a length by which the respective collar projects from said housing, and a respective bearing on said length of each of said collars journaling the respective collar on the respective housing, each of said articulation including:

a respective pivot between an end of the respective shaft extending through a respective one of said collars and the respective collar located inwardly of the respective said bearing and the respective collar within the respective house, each of said end of the respective shaft extending through the respective collar and the respective gear to the respective pivot, each said collar surrounding the respective shaft with clearance at an end of each collar remote from the respective pivot to permit angular excursion of each shaft relative to the respective housing and collar of the respective pivot.

2. The vehicle defined in claim 1 wherein the length of each collar, the diameters of the respective said bearing and the respective clearance are dimensioned with reference to the respective shaft to permit an excursion angle of at least 30° by the respective shaft at the respective pivot relative to the axis of the respective collar.

3. The vehicle defined in claim 1 wherein each of said collars is affixed by a bolt to an outer ring of the respective pivot and to the respective output gear.

4. The vehicle defined in claim 1, further comprising a respective coupling interposed between at least one of said output geard and the respective collar of a wheel on each side of said vehicle for decoupling of the respective wheel drives from the respective drive trains.

5. The vehicle defined in claim 1, further comprising a bellows seal having a funnel shape and interconnecting each of said shafts and the respective collar within the respective collar and widening away from the respective pivot.

6. The vehicle defined in claim 4 wherein said coupling includes a shift lever journaled in the respective housing of the respective distribution drive.

7. The vehicle defined in claim 6, further comprising a fluid actuator connected to said shift lever and located in the respective housing.

8. The vehicle defined in claim 1 wherein each drive train comprises drive shafts extending through at least some of said housings and having axes which are coplanar with the axes of said collars thereof.

9. The vehicle defined in claim 1 wherein each of said housings includes a drive gear meshing with the respective output gear and in a 1:1 transmission ratio thereof, each of said wheel drives including gearing with a reduction ratio of at least 2:1 between the respective input gear and the respective wheel.

* * * * *